US008064727B2

(12) United States Patent
Lueck

(10) Patent No.: US 8,064,727 B2
(45) Date of Patent: Nov. 22, 2011

(54) ADAPTIVE IMAGE MAPS

(75) Inventor: Michael F. Lueck, Kitchener (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/860,607

(22) Filed: Aug. 20, 2010

(65) Prior Publication Data

US 2010/0316302 A1   Dec. 16, 2010

Related U.S. Application Data

(63) Continuation of application No. 11/233,288, filed on Sep. 22, 2005, now Pat. No. 7,796,837.

(51) Int. Cl.
*G06K 9/20* (2006.01)
*G06K 9/34* (2006.01)
*G06K 17/00* (2006.01)

(52) U.S. Cl. ........ 382/286; 382/173; 715/205; 715/206; 715/208; 715/243; 715/248

(58) Field of Classification Search ................... 382/113, 382/173, 181; 715/200, 205, 234, 243, 246, 715/249, 253
See application file for complete search history.

(56) References Cited

U.S. PATENT DOCUMENTS

| | | | | |
|---|---|---|---|---|
| 4,484,192 A * | 11/1984 | Seitz et al. | ............. | 340/995.18 |
| 4,737,916 A * | 4/1988 | Ogawa et al. | ............. | 701/200 |
| 4,847,604 A * | 7/1989 | Doyle | ............. | 345/180 |
| 4,984,279 A * | 1/1991 | Kidney et al. | ............. | 382/113 |
| 5,297,051 A * | 3/1994 | Arakawa et al. | ............. | 701/200 |
| 5,353,132 A * | 10/1994 | Katsuma | ............. | 358/539 |
| 5,444,797 A * | 8/1995 | Spitz et al. | ............. | 382/192 |
| 5,533,174 A * | 7/1996 | Flowers et al. | ............. | 358/1.15 |
| 5,721,851 A | 2/1998 | Cline et al. | | |
| 5,852,810 A | 12/1998 | Sotiroff et al. | | |
| 5,893,127 A * | 4/1999 | Tyan et al. | ............. | 715/209 |
| 5,918,013 A | 6/1999 | Mighdoll et al. | | |
| 5,983,244 A * | 11/1999 | Nation | ............. | 715/236 |
| 6,000,612 A * | 12/1999 | Xu | ............. | 235/454 |
| 6,075,537 A * | 6/2000 | Adapathya et al. | ............. | 715/760 |
| 6,085,135 A * | 7/2000 | Steckel | ............. | 701/50 |
| 6,154,205 A | 11/2000 | Carroll et al. | | |
| 6,154,295 A | 11/2000 | Fredlund et al. | | |
| 6,185,625 B1 * | 2/2001 | Tso et al. | ............. | 709/247 |
| 6,230,174 B1 * | 5/2001 | Berger et al. | ............. | 715/201 |

(Continued)

OTHER PUBLICATIONS

Dictionary.com, http://dictionary.reference.com/browse/image+map, p. 1-2.*

(Continued)

*Primary Examiner* — Jason M Repko
*Assistant Examiner* — Gandhi Thirugnanam
(74) *Attorney, Agent, or Firm* — Fish & Richardson P.C.

(57) ABSTRACT

A computer implemented method of processing an image for display on a mobile communication device includes extracting a portion of an image based on an image map. The image map relates to the portion of the image. The method also includes generating a document that comprises the extracted portion of the image and transmitting the generated document to a remote device for display. The method may also include assigning a selectable link to the extracted portion of the image and receiving a request from the remote device for an initial document having the image and image map. Additionally, the method may include storing in a database the generated document and transmitting the stored generated document in response to future requests for the initial document.

20 Claims, 7 Drawing Sheets

U.S. PATENT DOCUMENTS

| | | | |
|---|---|---|---|
| 6,300,947 B1* | 10/2001 | Kanevsky | 715/866 |
| 6,311,180 B1* | 10/2001 | Fogarty | 707/749 |
| 6,456,305 B1* | 9/2002 | Qureshi et al. | 715/800 |
| 6,532,373 B1 | 3/2003 | Jouin | |
| 6,563,961 B1 | 5/2003 | Murayama | |
| 6,580,823 B1* | 6/2003 | Englefield et al. | 382/162 |
| 6,616,701 B2* | 9/2003 | Doyle | 715/201 |
| 6,704,024 B2 | 3/2004 | Robotham et al. | |
| 6,714,204 B2 | 3/2004 | Ishida et al. | |
| 6,724,931 B1* | 4/2004 | Hsu | 382/155 |
| 6,741,744 B1* | 5/2004 | Hsu | 382/229 |
| 6,750,830 B1 | 6/2004 | Teshima et al. | |
| 6,826,417 B2 | 11/2004 | Seignol et al. | |
| 6,834,807 B2* | 12/2004 | Ehrhart et al. | 235/469 |
| 6,847,383 B2* | 1/2005 | Agnew | 345/660 |
| 6,920,295 B2 | 7/2005 | Yoshimura et al. | |
| 6,925,595 B1* | 8/2005 | Whitledge et al. | 715/234 |
| 6,978,418 B1* | 12/2005 | Bain et al. | 715/205 |
| 7,203,901 B2 | 4/2007 | Chen et al. | |
| 7,219,309 B2* | 5/2007 | Kaasila et al. | 715/800 |
| 7,260,261 B2* | 8/2007 | Xie et al. | 382/173 |
| 7,477,780 B2* | 1/2009 | Boncyk et al. | 382/165 |
| 7,737,993 B2* | 6/2010 | Kaasila et al. | 345/613 |
| 7,796,837 B2* | 9/2010 | Lueck | 382/286 |
| 7,966,557 B2* | 6/2011 | Shagam et al. | 715/243 |
| 2002/0015042 A1 | 2/2002 | Robotham et al. | |
| 2002/0021308 A1 | 2/2002 | White et al. | |
| 2002/0105529 A1* | 8/2002 | Bowser et al. | 345/629 |
| 2002/0120653 A1 | 8/2002 | Kraft et al. | |
| 2002/0151283 A1* | 10/2002 | Pallakoff | 455/90 |
| 2003/0052896 A1 | 3/2003 | Higgins et al. | |
| 2003/0137522 A1 | 7/2003 | Kaasila et al. | |
| 2003/0171926 A1* | 9/2003 | Suresh et al. | 704/270.1 |
| 2003/0222796 A1* | 12/2003 | Nagasaki | 340/995.1 |
| 2003/0229677 A1 | 12/2003 | Allan | |
| 2004/0004627 A1 | 1/2004 | Ohki | |
| 2004/0047518 A1* | 3/2004 | Tiana | 382/284 |
| 2004/0078753 A1* | 4/2004 | Doyle | 715/501.1 |
| 2004/0103143 A1 | 5/2004 | Chikada et al. | |
| 2004/0103371 A1* | 5/2004 | Chen et al. | 715/513 |
| 2004/0128342 A1* | 7/2004 | Maes et al. | 709/200 |
| 2004/0177323 A1* | 9/2004 | Kaasila et al. | 715/513 |
| 2004/0183817 A1* | 9/2004 | Kaasila | 345/660 |
| 2004/0215659 A1 | 10/2004 | Singfield et al. | |
| 2005/0014858 A1 | 1/2005 | Celi, Jr. et al. | |
| 2005/0041858 A1* | 2/2005 | Celi et al. | 382/173 |
| 2005/0140791 A1 | 6/2005 | Anderson | |
| 2005/0144555 A1* | 6/2005 | Morris | 715/513 |
| 2005/0149878 A1* | 7/2005 | White et al. | 715/784 |
| 2007/0073650 A1 | 3/2007 | Lueck | |
| 2008/0065980 A1* | 3/2008 | Hedbor | 715/234 |
| 2010/0210358 A1* | 8/2010 | Csurka et al. | 463/31 |

OTHER PUBLICATIONS

"Image Map", Nov. 30, 2010, http://en.wikipedia.org/wiki/Image_map, p. 1-3.*

"Objects, Images, and Applets", Dec. 24, 1999, "http://www.w3.org/TR/html401/struct/objects.html", p. 1-20.*

"image map", Apr. 7, 2009, "http://en.wiktionary.org/wiki/image_map".*

"What is image map? Definition from WhatIs.com", Apr. 5, 2005, http://whatis.techtarget.com/definition/0,,sid9_gci212328,00.html.*

Hori, M. et al., "Annotation-Based Web Content Transcoding", 2000, "http://www9.org/w9cdrom/169/169.html", p. 1-18.*

Fan, X. et al. "Visual Attention Based Image Browsing on Mobile Devices", 2003, ICME 2003, p. 53-56.*

Liu H. et al., "Automatic Browsing of Large Pictures on Mobile Devices", 2003, Multimedia 2003 Proceedings of the eleventh ACM internation conference on Multimedia, p. 148-155.*

Yasmin et al., "Transcoding of Document Images for Mobile Devices", 2004, ICVGIP 2004, p. 1-6.*

Chen, L. et al. "A visual attention model for adapting images on small displays", 2003, Multimedia Systems (2003), p. 1-12.*

Blenkhorn, et al. Screen Magnifiers: Architecture, Evolution and Evaluation, Department of Computation, UMIST, United Kingdom, updated (published prior to Sep. 22, 2005) pp. 1-10.

* cited by examiner

ADAPTIVE IMAGE MAPS

CROSS-REFERENCE TO RELATED APPLICATIONS

This application is a continuation application of and claims priority to U.S. application Ser. No. 11/233,288, filed on Sep. 22, 2005, entitled "System and Method for Image Processing," the entire content of which are hereby incorporated by reference.

TECHNICAL FIELD

This application relates to processing an image for display.

BACKGROUND

As computers and computer networks become more and more able to access a variety of graphical information, people are demanding more ways to obtain that information. Specifically, people now expect to have access, on the road, in the home, or in the office, to information previously available only from a permanently-connected personal computer hooked to an appropriately provisioned network. They want images of current people in the news from their cell phones, e-mail with photographs of family from their personal digital assistants (PDAs), and up-to-date documents with embedded pictures from their palm tops. They also want all of this information when traveling, whether locally, domestically, or internationally, in an easy-to-use, portable device.

Portability generally requires a device small in size, which in turn limits the screen area available for displaying content. This limitation may require the portable device to reduce images to an illegible or unrecognizable state when displayed on a small screen. Alternatively, the image may be displayed at a larger size, but a user must scroll to see some parts of the image.

Additionally, some images may be associated with image maps that defined portions of the image as "hotspots," or links, a user may select to perform an action, such as navigating to a web page. Some current portable devices do not maintain the link with the defined portions of the image. Instead, the devices separate the links from the image and list them as textual links outside the image. These separated links, however, are no longer associated with the context provided by the image to guide the user in selecting the links. The separation of the links from the graphical context can confuse the user as to the content of the links.

SUMMARY

This document discloses methods and systems for processing an image for display on a wireless device.

In accordance with one aspect, a computer-implemented method of processing an image for display on a mobile communication device is disclosed. The method includes extracting a portion of an image based on an image map, which relates to the portion of the image, generating a document that comprises the extracted portion of the image, and transmitting the generated document to a remote device for display. Additionally, a selectable link may also be assigned to the extracted portion of the image.

In one implementation, the method may include receiving a request from the remote device for an initial document that has the image and image map and storing the generated document in a database. The stored generated document may be transmitted in response to future requests for the initial document. The request may also include information associated with display capabilities of the remote device. The method may include modifying dimensions of the extracted portion of the image based on the display capabilities. In addition, the method may include cropping the extracted portion of the image based on the display capabilities.

In another implementation, the method may also include retrieving the initial document from a remote web server. The image map may be selected by organizing elements in the initial document into a document object model tree and traversing the tree to locate the image map. The image map may also be selected by serially parsing elements in the initial document to locate the image map. Content of the image map may be generated using a facial recognition algorithm, where the content includes coordinates used to specify the portion of the image for extraction. Also, content of the image map may be generated using an optical character recognition algorithm, where the content comprises coordinates used to specify the portion of the image for extraction.

As one example, the image map includes a markup language tag used to specify that the extracted portion of the image should be sized for display on a mobile device browser. An area adjacent to the extracted portion may also be extracted so that a combination of the area and portion are a predetermined size or shape. Also, image data may be generated for display in an area adjacent to the extracted portion so that a combination of the generated image data and the extracted portion are a predetermined size or shape.

In yet another implementation, a second portion of the image may be extracted based on the image map and the second portion may be included in the generated document for display on the remote device. A position in which the portions are displayed is based on the image map, where the image map further includes position indicators. Also a position in which the portions are displayed may be based on the content of the image. The second portion and the first portion may be a same size and shape.

In accordance with another aspect, a computer implemented system for selecting portions of an image for display on a mobile device is disclosed. The system includes a parser to select an image and an image map from a first electronic document, means for extracting a portion of the image, wherein a position and perimeter of the portion are based on the image map, a document generator to generate a second electronic document comprising the extracted portion of the image, and an interface to transmit the second electronic document to a remote device.

In accordance with yet another aspect, a system for extracting a portion of an image for display on a mobile device is disclosed. The system includes an extractor to divide an image into segments based on coordinates associated with the image, a document generator to encode at least one of the segments for display in an electronic document, and an interface to transmit the electronic document to a remote device.

The systems and techniques described here may provide one or more of the following advantages. A system may select and extract portions from an image so that a user may more conveniently view the image on a portable device. A system may extract portions of interest in the images to display. Also, a system may enable a remote device to maintain a graphical context for links used within an image map. This maintenance of the graphical context may be possible even if the remote device does not have an algorithm to display image maps. Additionally, the system can be implemented with portable systems, such as cellular telephones, having limited resources, such as memory and processing power.

The details of one or more implementations are set forth in the accompanying drawings and the description below. Other features, objects, and advantages of the implementations will be apparent from the description and drawings, and from the claims.

DESCRIPTION OF DRAWINGS

These and other aspects will now be described in detail with reference to the following drawings.

Like reference symbols in the various drawings indicate like elements.

DETAILED DESCRIPTION

Figure 1:
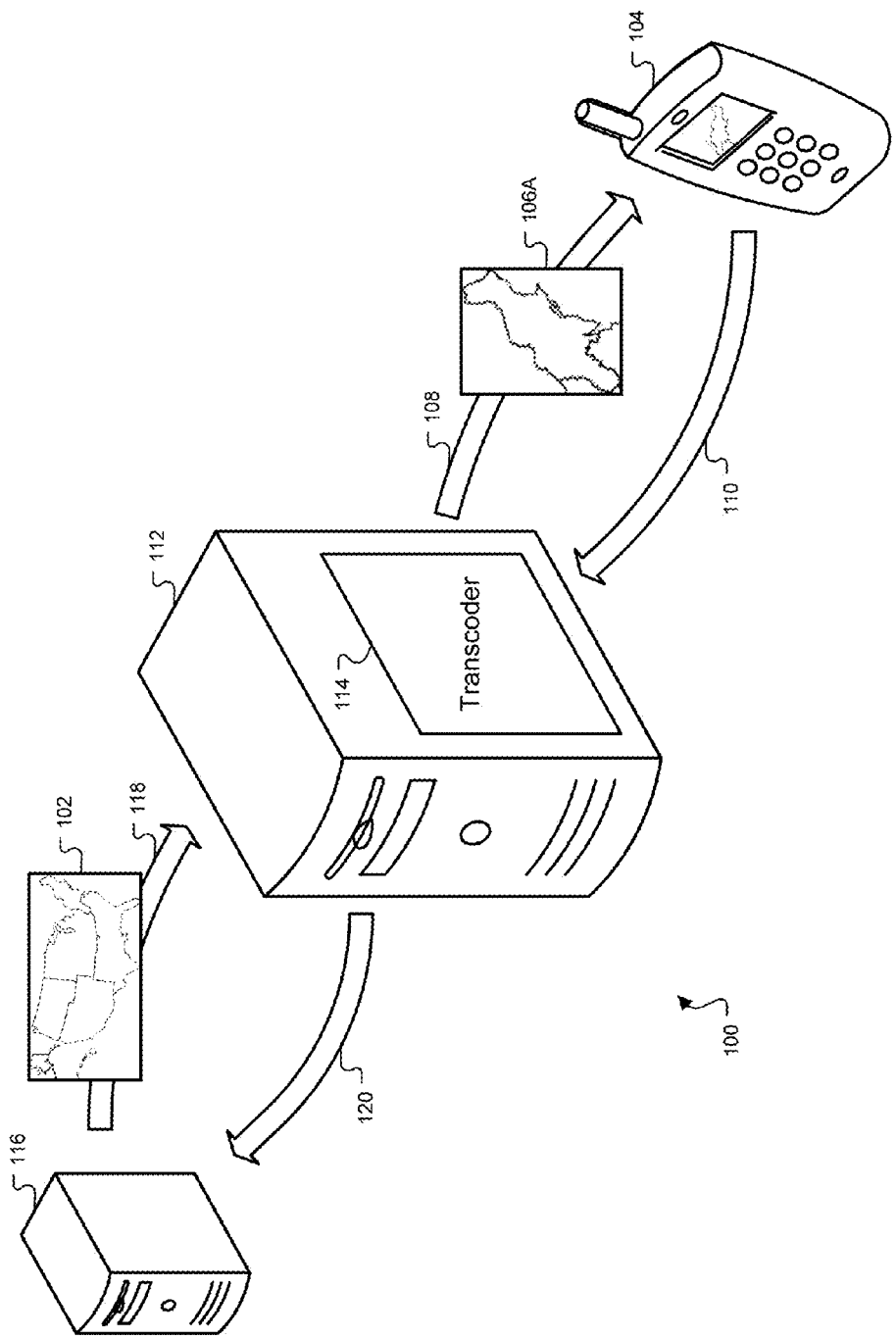
FIG. 1 is a schematic diagram of a system for processing an image to be displayed on a wireless communication device according to one implementation.

FIG. 1 is a schematic diagram of a system 100 for processing an image 102 to be displayed on a wireless communication device 104 according to one implementation. The processing includes extracting a portion 106A of the image 102 based on an image map (not shown) that specifies the portion 106A of the image 102 to be extracted. The processing further includes generating a document that includes the portion 106A and transmitting the generated document to the remote wireless communication device 104, as represented by the arrow 108.

The image 102 may be contained in an initial document having a format, such as a word processing document, a stand alone image file, an electronic mail message, or a web page. In one implementation, the initial document contains an image with an associated image map. The image map may include information, such as coordinates of opposite corners of a rectangle that specify one or more areas within the image that have an action associated with them. For example, the image portion 106A of FIG. 1 depicts the northeastern section of the United States. A user may select this image portion 106A and the browser may be directed to a website describing tourism in the Northeast.

In some implementations, the processing of the document is initiated by a request, represented by the arrow 110, from the remote wireless communication device 104 for the initial document having the image 102. An image processing system 112 receives the request. A transcoder 114 in the image processing system 112 processes the image 102 and the image processing system 112 transmits the generated document containing the image portion 106A to the wireless communication device 104.

In other implementations, the image processing system 112 sends the generated document to the wireless communication device 104 without a request from the wireless communication device 104. For example, an image in an electronic mail message may be processed by the image processing system 112 and transmitted to the wireless communication device 104 without being requested by the wireless communication device 104.

In some implementations, the image processing system 112 retrieves the initial document from a remote web server 116, as represented by the arrow 118. For example, a user of the wireless communication device 104 may view a list of web page links retrieved from a web search. The list may include a web page link specifying a web page at the remote web server 116 such as:

http://www.remotewebserver.com/initial_document.html. The image processing system 112 may modify the actual Uniform Resource Locator (URL) accessed when the user selects the web link above so that the link is first directed to the image processing system 112, such as in the following URL:

http://www.google.com/?u=www.remotewebserver.com/initial_document.html.

Here, "www.google.com" is the network address of the image processing system 112. The "?u=www.remotewebserver.com/initial_document.html" parameter in the URL directs the image processing system 112 to request from the remote web server 116 the initial document located at "www.remotewebserver.com/initial_document.html," as represented by the arrow 120. The image processing system 112 processes the initial document and transmits the generated document to the wireless communication device 104.

Figure 2:
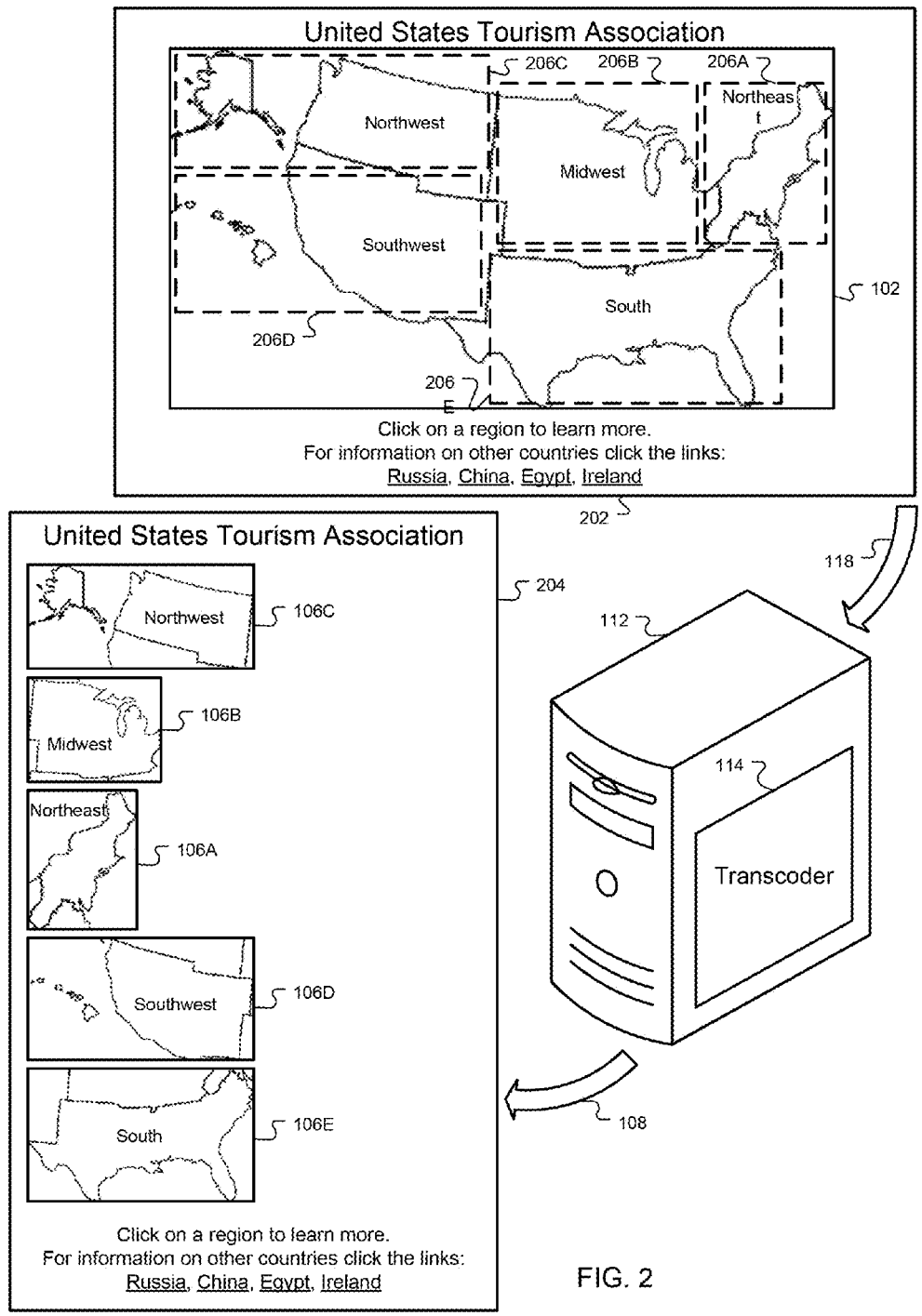
FIG. 2 is a schematic diagram of an image before and after processing by the system of FIG. 1 according to one implementation.

FIG. 2 is a schematic diagram of the image 102 before and after processing by the system of FIG. 1 according to one implementation. For example, the initial document 202 may be a web page describing tourist destinations in different regions of the United States (US). FIG. 2 shows an example of an initial document 202 prior to processing and a generated document 204 after processing. The image 102 in the initial document 202 includes an image map containing several areas 206A-E. The areas 206A-E indicate regions of the image 102 that have an action associated with them, such as a hyperlink to another web page, a hyperlink to an electronic mail address, or a hyperlink to a File Transfer Protocol (FTP) site.

For example, selecting the Northeast area 206A may take the user to another web page that lists tourist destinations in the northeastern states of the US or it may initiate an electronic mail message with a "To:" field directed to a member of the Northeast US board of tourism. Alternatively, the areas 206A-E may represent regions of particular interest in the image 102. For example, an image of a person may have the person's face as a defined area. Additionally, an image of a group of people may have a defined area around a particular person if the image is accompanied by text mentioning that person. The generated document 204 contains the image portion 106A corresponding to the area 206A in the initial document 202. In the implementation of FIG. 2, the generated document 204 also contains other image portions 106B-E corresponding to the other areas 206B-E in the image 102.

In the implementation shown in FIG. 2, the transcoder 114 in the image processing system 112 may extract the image portions 106A-E from the image 102 using the areas 206A-E in the image map. Particularly, each of the image portions 106A-E corresponds to each of the areas 206A-E in the image map, respectively.

Figure 3:
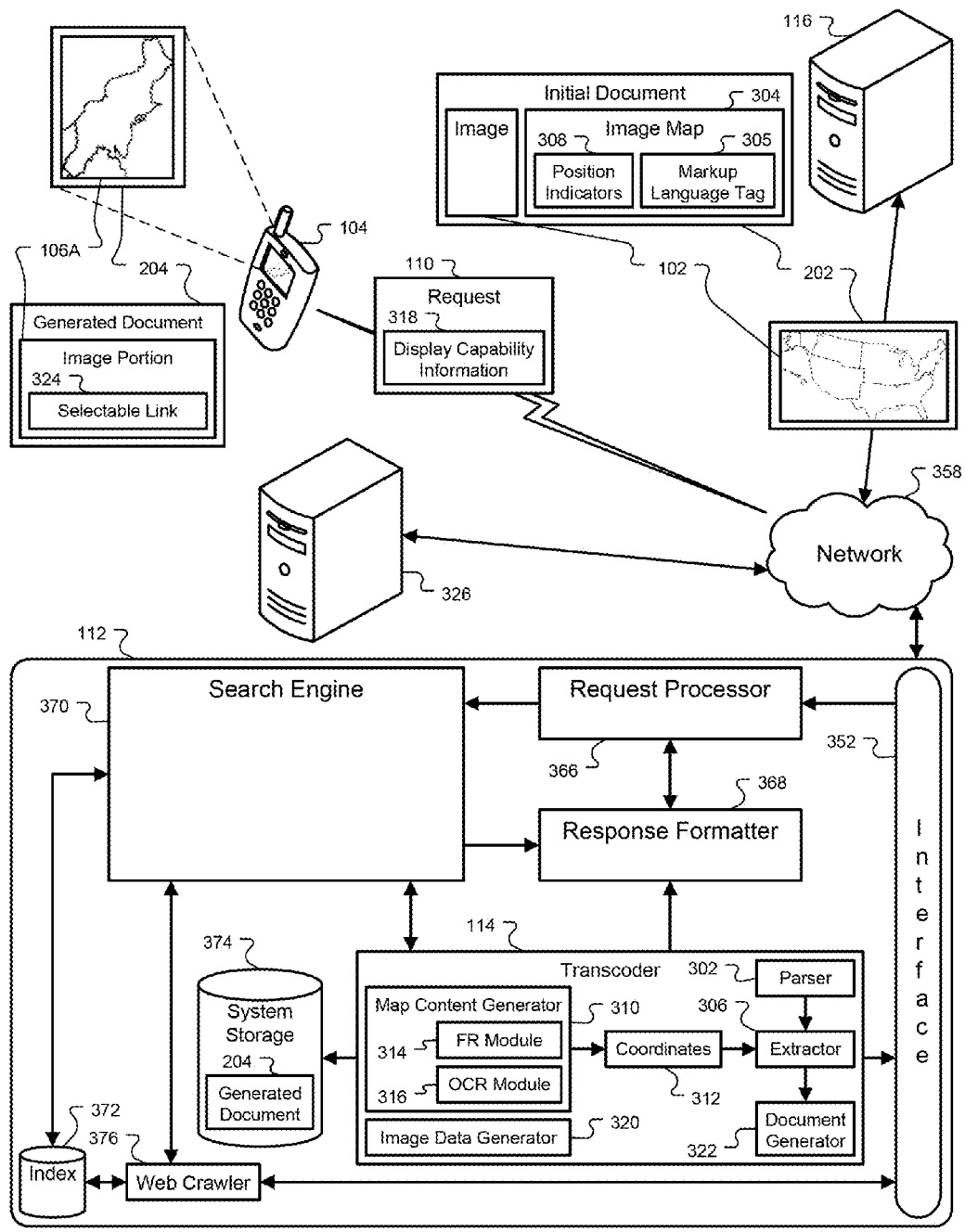
FIG. 3 is a block diagram of the system of FIG. 1 showing more detail.

FIG. 3 is a block diagram of the system 100 of FIG. 1 showing more detail. FIG. 3 shows the image processing system 112 and devices in communication with it. The image processing system 112 may be implemented, for example, as part of an Internet search provider's general system.

The image processing system 112 is provided with an interface 352 to allow communications with a network 358, such as the Internet. The image processing system 112 may communicate with various devices, such as the wireless communication device 104 and the remote web server 116. The communication flow for any device may be bidirectional so that the image processing system 112 may receive information, such as commands, from the devices, and may also send information to the devices.

Commands and requests received from devices may be provided to a request processor 366, which may interpret a request, associate it with predefined acceptable requests, and pass it on, such as in the form of a command to another component of the image processing system 112 to perform a particular action. For example, in an implementation where the image processing system 112 is part of the Internet search provider's general system, the request may include a search request. The request processor 366 may cause a search engine 370 to generate search results corresponding to the search request. The search engine 370 may use data retrieval and search techniques like those used by the Google PageRank™ system. The results generated by the search engine 370 may then be provided back to the original requester using a response formatter 368, which carries out necessary formatting on the results.

The search engine 370 may rely on a number of other components for its proper operation. For example, the search engine 370 may refer to an index 372 of web sites instead of searching the web sites themselves each time a request is made, so as to make the searching much more efficient. The index 372 may be populated using information collected and formatted by a web crawler 376, which may continuously scan potential information sources for changing information.

The transcoder 114 may access a system storage 374. The system storage 374 may be one or more storage locations for files needed to operate the system, such as applications, maintenance routines, and management and reporting software. In some implementations, the transcoder 114 may store the generated document 204 in the system storage 374. The image processing system 112 may transmit the stored generated document 204 in response to future requests for the initial document 202.

The transcoder 114 may include several components used to process the initial document 202 and the image 102. A parser 302 may select the image 102 and an image map 304 associated with the image 102 from the initial document 202. The parser 302 may decode the entire initial document 202 using an application programming interface (API) to access the content of the initial document 202. For example, if the initial document 202 is a web page, the parser 302 may access the elements, or document objects, of the web page using a document object model (DOM) API. Using the DOM API, the parser 302 may load the document objects from the initial document 202 into memory using a variety of data structures, such as an array, a queue, or a tree. The DOM may allow the document objects to be accessed randomly, or in an order different from the order in which they are specified in the initial document 202. Alternatively, the parser 302 may input the initial document 202 as a series of characters or character strings. The characters or strings may be serially compared with a set of predefined identifiers that specify the existence of an image and its associated image map.

The image map 304 may contain one or more markup language tags 305 that define the image map 304. For example, hypertext markup language (HTML) uses the tag "<img>" for an image and "<map>" for an image map. The <map> tag may contain <area> tags that specify the coordinates and hyperlink of each of the areas 206A-E in the image 102 using a "coords" attribute and an "href" attribute, respectively. The <area> tag may also contain a "shape" attribute specifying the shape of the area in the image 102, such as a rectangle, a circle, or a polygon. If the image has an associated image map, the <img> tag may include a "usemap" attribute. When parsing the document content randomly, such as with a DOM, the "usemap" attribute can be used to locate an image map associated with the image. The "usemap" attribute may precede the name of the image map 304, which may be used to locate and access the image map 304 within a data structure, such as the DOM tree 500 shown in FIG. 5.

The transcoder 114 may also include an extractor 306 that uses the coordinates contained in the image map 304 to extract the image portion 106A from the image 102. The coordinates may indicate a position and a perimeter of the image portion 106A extracted. The coordinates may be components of a markup language, such as attributes within an HTML tag as described above.

In some implementations, a map content generator 310 may provide coordinates 312 of image portions to the extractor 306. The map content generator 310 may contain a facial recognition (FR) module 314 and an optical character recognition (OCR) module 316 that determine the coordinates of faces and text, respectively, within an image or an image portion. The map content generator 310 may contain other modules, such as a module that recognizes areas of high contrast to locate objects within an image (e.g. a dark building against a light colored sky). The coordinates 312 may also supplement or modify the coordinates located in the image map 304. For example, the FR module 314 may determine coordinates of a face located in an image portion defined by an image map. Alternatively, the map content generator 310 may provide the coordinates 312 for an image that does not have an associated image map included in the initial document 202. For example, the OCR module 316 may determine coordinates of text located in an image that has no image map, generate an image map for the image, and populate the image map with the coordinates 312.

The transcoder 114 may make further modifications to the extracted portions 106A-E before incorporating the portions 106A-E into the generated document 204. For example, the request 110 from the wireless communications device 104 may include display capability information 318 regarding the physical capabilities of the display in the wireless communication device 104, such as the display's dimensions and resolution.

The transcoder 112 may use the display capability information 318 to determine that the image portion 106A is, for example, either too large or too detailed for the wireless communication device 104 to display effectively to the user. In this situation, the map content generator 310 may use modules, such as the FR module 314 and the OCR module 316, to focus on relevant information in the image portion 106A, such as a face or text. The output of the map content generator 310 may include the coordinates 312 that are used by the extractor 306 to define how to process the extracted portions. For example, the coordinates 312 may define an area of the image portion 106A that should be cropped. Cropping may include shifting an image so that it is centered on a face or text, and removing surrounding image data so that the resulting cropped image displays at a smaller size. The coordinates 312 may include points along an x and a y axis, where the points define boundaries of the cropped image.

In another implementation, the display capability information 318 may be used to determine coordinates 312 generated by the map content generator 310. For example, if the display capability information 318 indicates the image 102 is too large or too detailed for the wireless communication device 104 to display, the FR module 314 and the OCR module 316 could generate the coordinates 312 defining relevant information in the image 102, as described above.

In another implementation, the coordinates 312 may be used by the extractor 306 to modify the dimensions of the image 102 or the image portion 106A by magnifying or shrinking the image 102 or the image portion 106A. For example, the FR module 314 or the OCR module 316 may locate a face or text, respectively, in the image 102 and may generate coordinates that define an area around these features. The map content generator 310 may generate a magnification or shrinking factor using the display capability information 318 to determine a size to display the image 102 on the wireless communication device 104. For example, each pixel of the shrunken image may be a weighted sum of linearly corresponding pixels, such as in the following equation:

$$P_0 = P_0 \times 3/5 + P_1 \times 2/5.$$

The weights may be associated with the shrinking factor. For instance, the shrinking factor may be used to look up the weights in an index, or it may be used as a multiplier for a set of weights to produce the appropriate final weights for the shrinking process.

For example, the display capability information 318 may contain a resolution of the display used by the wireless communication device 104, such as 480 pixels by 600 pixels. The map content generator 310 may provide a shrinking factor that reduces an image larger than 480 pixels by 600 so that it can fit within the resolution displayed on the wireless communication device 104.

The coordinates 312 output from the map content generator 310 may include the points along the x and y axes and the magnification or shrinking factor. The extractor 306 may use the coordinates 312 to determine how to process the image 102 or the image portion 106A. For example, if the coordinates 312 include a shrinking factor, the extractor 306 may selectively remove pixels in the image 102 or the image portion 106A.

In some implementations, the map content generator 310 ensures that extracted portions are of a predetermined size and shape. For example, the map content generator 310 may ensure that image data adjacent to a circular image portion is extracted so that the image portion 106A is a rectangular shape. In other implementations, an image data generator 320 generates image data in an area adjacent to an image portion to ensure that the image portion is a predetermined size and shape. For example, the image data generator 320 may add a black rectangular background behind a circular image portion to ensure that the image portion 106A is rectangular. Additionally, the image data generator 320 may determine the color values of the image portion 106A and generate contrasting or complimenting image data for the background behind the image portion 106A.

The transcoder 114 may also include a document generator 322. In one implementation, the document generator 322 creates the generated document 204 using the image portion 106A provided by the extractor 306 and content from the initial document 202. For example, the area 206A within the image 102 may have an associated HTML attribute specifying a hyperlink to another web page. The document generator 322 may add a selectable link 324 to the image portion 106A in the generated document 204 corresponding to the hyperlink associated with the area 206A in the initial document 202. If the hyperlink is a link to another web page, the selectable link 324 within the generated document 204 may contain the network address of the image processing system 112. In a manner similar to the search list described above, the hyperlink first directs the web page request to the image processing system 112, where the image processing system 112 will retrieve the web page and forward it to the wireless communication device 104 after processing the web page. For example, the initial document 202 may contain the following hyperlink to another document at a second remote web server 326:

http://www.secondwebserver.com/another_document.html.

The document generator 322 modifies the hyperlink so that it is first directed to the image processing system 112, such as in the following URL:

http://www.google.com/?u=www.secondwebserver.com/another_document.html.

Figure 4:
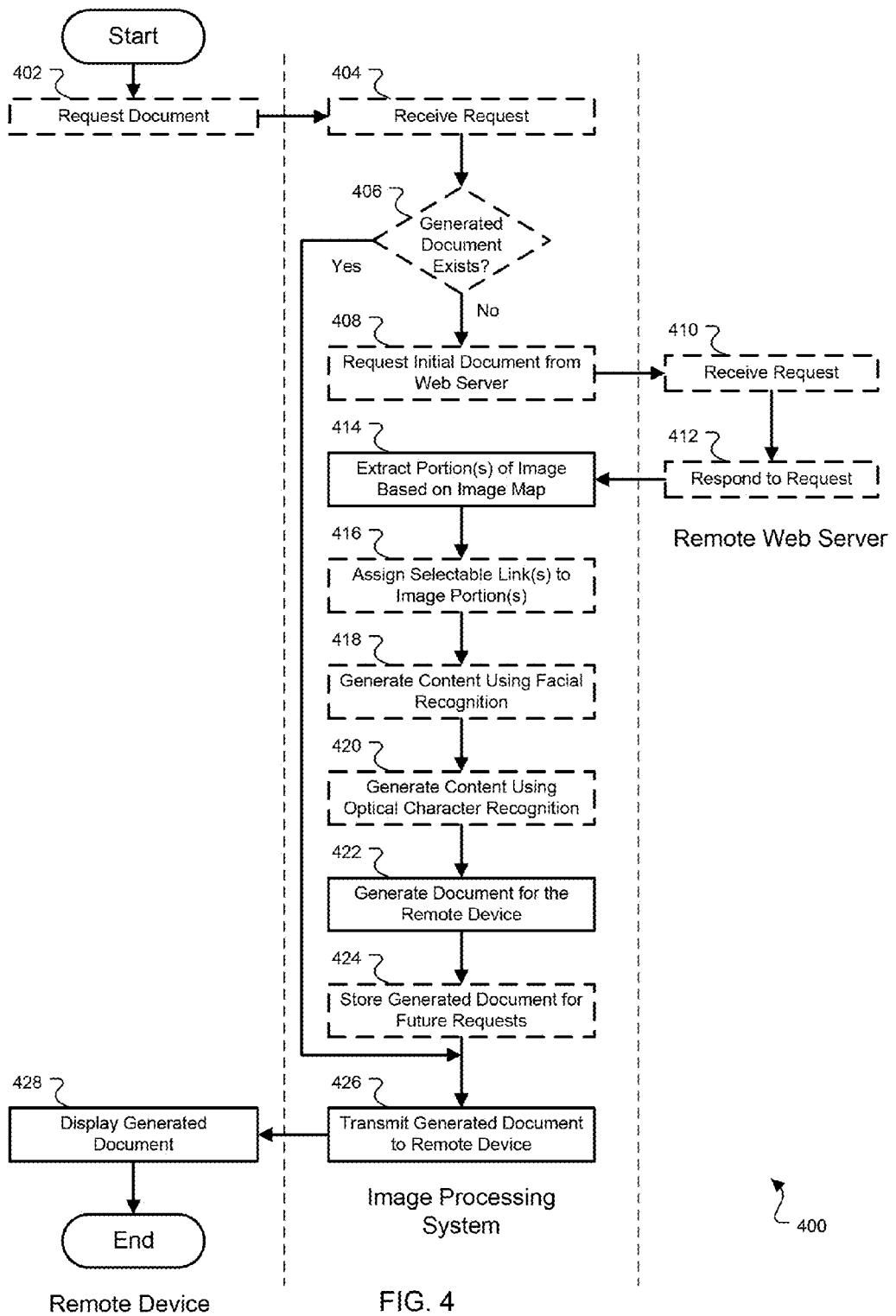
FIG. 4 is a flow chart of exemplary operations that can be performed when processing an image to be displayed on the wireless communication device.

FIG. 4 is a flow chart of exemplary operations 400 that can be performed when processing an image to be displayed on the wireless communication device 104. For example, the operations 400 can be performed in the image processing system 112. A processor executing instructions stored in a computer program product can perform the operations 400. The operations 400 may begin in optional step 402 with a request for an initial document from a remote device. For example, the user of the wireless communication device 104 may send the request 110 to the image processing system 112 for the initial document 202.

In optional step 404, the image processing system 112 receives the request for the initial document. In optional step 406, if a generated document corresponding to the initial document already exists the operations 400 move to step 426. If the generated document does not yet exist the operations 400 move to optional step 408. For example, the image processing system 112 may use an indexed list of generated documents to quickly determine if a generated document exists. In some implementations, multiple generated documents may be stored for each initial document corresponding to possible display capabilities of wireless communication devices. For example, the display capability information 318 may indicate that the wireless communication device 104 is a cell phone with a display resolution of 128 by 128 pixels. This information 318 may be stored along with a document identifier when a document is generated. Subsequent requests may be compared to the document identifier and the display capability information to determine if a new document should be generated. In the case described above, if a different or the same device with a display resolution of 128 by 128 pixels requests the same initial document, the index may be queried to determine if the initial document has a version associated with this pixel resolution. If so, this document can be returned without generating a new document.

In optional step 408, the initial document may be requested from the remote web server. In optional step 410, the remote web server receives the request, and, in optional step 412, the remote web server sends a response to the request including the initial document. For example, the image processing system 112 requests a web page, such as www.cnn.com, from the remote web server 116 that hosts the CNN™ web page. The CNN™ web server 116 sends a response that includes the web page for www.cnn.com to the image processing system 112.

In step 414, one or more portions of an image contained in the initial document are extracted based on an image map that may be contained in the initial document. For example, the parser 302 within the transcoder 114 identifies the image 102 and the image map 304 contained in the initial document 202. The extractor 306 extracts the image portion 106A using the image map 304. Alternatively, the image map 304 may not be contained in the initial document 102. Instead, the map content generator 310 may generate the image map used by the extractor 306 to extract the image portion 106A.

In optional step 416, selectable links are assigned to the image portions. For example, the transcoder 114 may assign the selectable link 324 to the image portion 106A, such as by assigning a hyperlink to the "href" attribute of an anchor <a> tag placed around the <img> tag associated with the image portion 106A.

In optional steps 418 and 420, content of the image map may be generated using a facial recognition algorithm and an optical character recognition algorithm, respectively. For example, the FR module 314 or the OCR module 316 or both may provide the coordinates 312 to the extractor 306 of an image portion that focuses on a face or text, respectively. Steps 414 through 420 may occur in a different order. For example, facial recognition and optical character recognition may occur before the image portion is extracted.

In step 422, a document including the image portion is generated for the remote device. For example, the document generator 322 creates the generated document 204 using the extracted image portion 106A and the initial document 202.

In optional step 424, the generated document is stored in a database that may be accessed in response to subsequent requests for the initial document. For example, the transcoder 114 may store the generated document 204 in the system storage 374. In some implementations, the transcoder 114 may store along with the generated document 204 the display capability information 318 used to modify the images in the generated document 204.

In step 426, the generated document is transmitted to the remote device. For example, the interface 352 of the image processing system 112 transmits the generated document 204 through the network 358 to the wireless communication device 104. The operations 400 may complete in step 428, where the generated document is displayed on the remote device.

Figure 5:
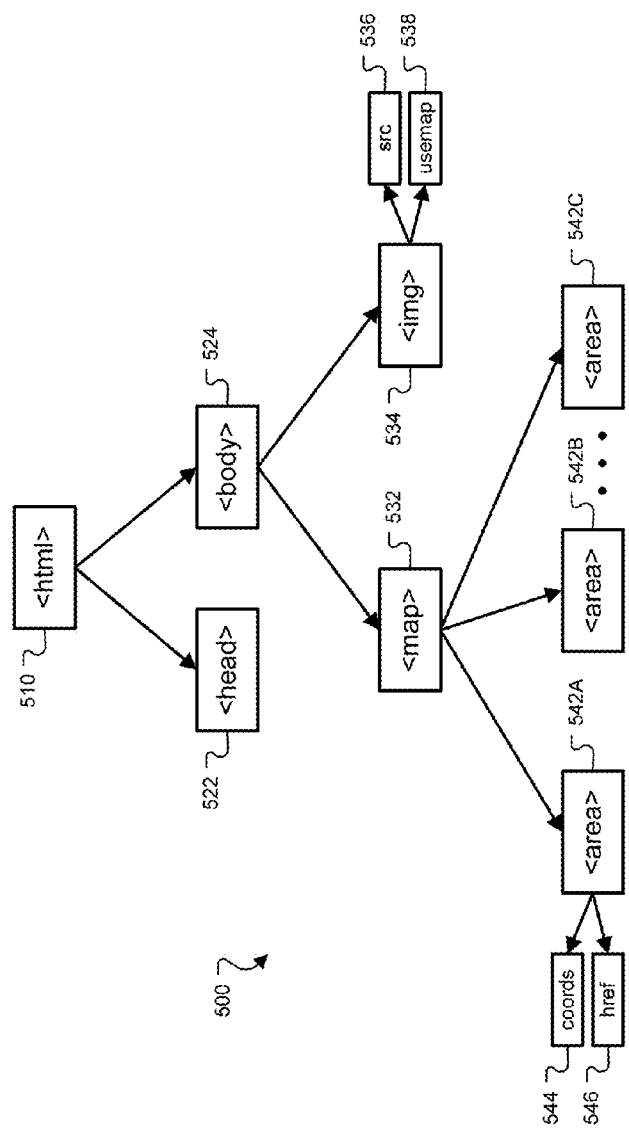
FIG. 5 is an exemplary document object model (DOM) tree of a web page including an image.

FIG. 5 is an exemplary document object model (DOM) tree 500 of a web page including an image. FIG. 5 shows an exemplary DOM tree 500 for the initial document 202. In one implementation, the initial document 202 is in a hypertext markup language (HTML) format. Each HTML tag in the initial document 202 may be represented by a node in the tree 500. In some implementations, the parser 302 parses the initial document 202 into the DOM tree 500 and traverses the tree 500 to locate the image, the image map, or both.

In the example of FIG. 5, the DOM tree 500 contains an <html> node 510, a <head> node 522, and a <body> node 524 representing an <html> tag, a <head> tag, and a <body> tag, respectively, in the initial document 202. The <body> node 524 has a child <map> node 532. The <map> node 532 and its children may specify the coordinates of the areas 206A-E used to extract the image portions. The <body> node 524 also has a child <img> node 534. The <img> node 534 is a placeholder for the image 102. The "src" attribute 536 of the <img> node 534 indicates the location and name of the image 102. The "usemap" attribute 538 of the <img> node 534 indicates the name or id of the <map> node 532 associated with the image 102. The <map> node 532 may have several child <area> nodes 542A-C. Each of the <area> nodes 542A-C may have a "coords" attribute 544 specifying the coordinates of the image portion associated with it and an "href" attribute 546 specifying a hyperlink to be executed when the image portion is selected.

Figure 6:
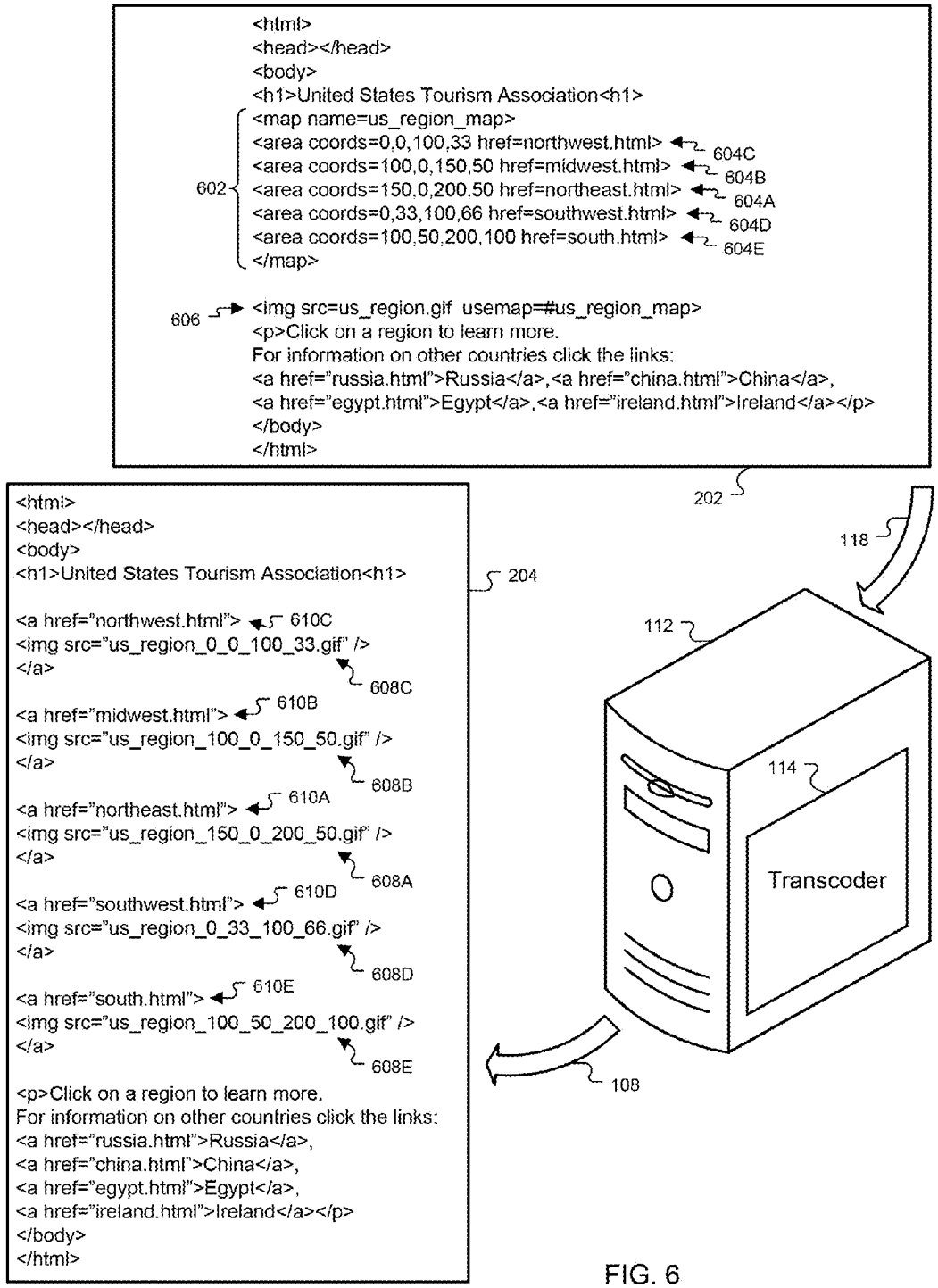
FIG. 6 is a schematic diagram showing hypertext markup language (HTML) code processed for display on the wireless communication device according to one implementation.

FIG. 6 is a schematic diagram showing HTML code processed for display on the wireless communication device 104 according to one implementation. FIG. 6 shows the HTML code in the initial document 202 before processing by the transcoder 114 in the image processing system 112 and the HTML code in the generated document 204 after processing by the transcoder 114. The initial document 202 may contain a <map> tag 602 whose child <area> tags 604A-E specify the coordinates of and the hyperlinks associated with the areas 206A-E, respectively. The initial document 202 also contains an <img> tag 606, which is a placeholder for the image 102, having a name "us_region.gif," and the associated <map> tag 602, having the name "us_region_map."

In some implementations, the initial document 202 is parsed and loaded into memory, such as in the DOM tree 500 of FIG. 5. Here, the <map> tag 602 corresponds to the <map> node 532 in the DOM tree 500. The <area> tags 604A-E correspond to the <area> nodes 542A-C of the DOM tree 500 and the <img> tag 606 corresponds to the <img> node 534 of the DOM tree 500.

The generated document 204 may include the individual <img> tags 608A-E and <a> tags, subsequently referred to as <anchor> tags 610A-E. Each of the new <img> tags 608A-E specifies one of the image portions extracted by the transcoder 114. Here, the names of the <img> tags 608A-E in the "src" attributes include the name of the original image 102 and the coordinates of the <area> tags 604A-E, respectively. Each of the <img> tags 608A-E is a child of the <anchor> tags 610A-E, respectively, which specify the hyperlinks associated with the image portions in the associated "href" attributes.

In some implementations, the HTML tag or attributes in the initial document 202 contain information about how a particular device, such as the wireless communication device 104, should size the image 102 for display. For example, the HTML code may include tags that identify content for a particular type of device, such as a <mobile> tag, a <PDA> tag, a <cell phone> tag, and a <motorola_v66> tag that identify content for a mobile device, a personal digital assistant, a cell phone, and a specific type of cell phone, respectively. The tags may also identify a particular type of content, such as a <face> tag or a <text> tag that identify a portrait image and text in an image, respectively. The map content generator 310 may use these tags to determine the coordinates 312 provided to the extractor 306.

In some implementations, each extracted image portion is sized and shaped the same. For example, the image portions 106A-E may be extracted using the maximum size and shape that can be displayed on the wireless communication device 104. The display capability information 318 may include the dimensions of the display used by the wireless communication device 104. The map content generator 310 may generate magnification and shrinking factors such that two or more of the image portions 206A-E are sized the same as the display dimensions.

In some implementations, the image portions are displayed in an order other than the order of the <area> tags 604A-E, such as by grouping image portions by size, shape, type, hyperlink, or other associated information within the HTML. For example, image portions having hyperlinks to the same network address may be listed together. Circular image portions may be listed before rectangular image portions and polygonal image portions. Image portions may be listed in descending or ascending order according to the original size of the areas 206A-E.

In some implementations, the content of the image portions is used to order the image portions, such as by grouping faces, text, or text styles together. For example, image portions including bold or large text may be listed before plain or small text. Image portions containing faces may be listed before other image portions that do not contain faces.

Referring to FIG. 3, the display order, or positioning, may be dictated by position indicators 308 included in the image map 304 of the initial document 102. For example, the position indicators 308 may specify that faces are displayed first or that the image portion 106A is displayed first, the image portion 106B is displayed next, and the image portion 106C is displayed third. In another implementation, the position indicators 308 may be generated by the map content generator 310 and output for use by the document generator 322, which may use the position indicators 308 to generate the document 204 with the image portions 106A-E in the specified order.

Figure 7:
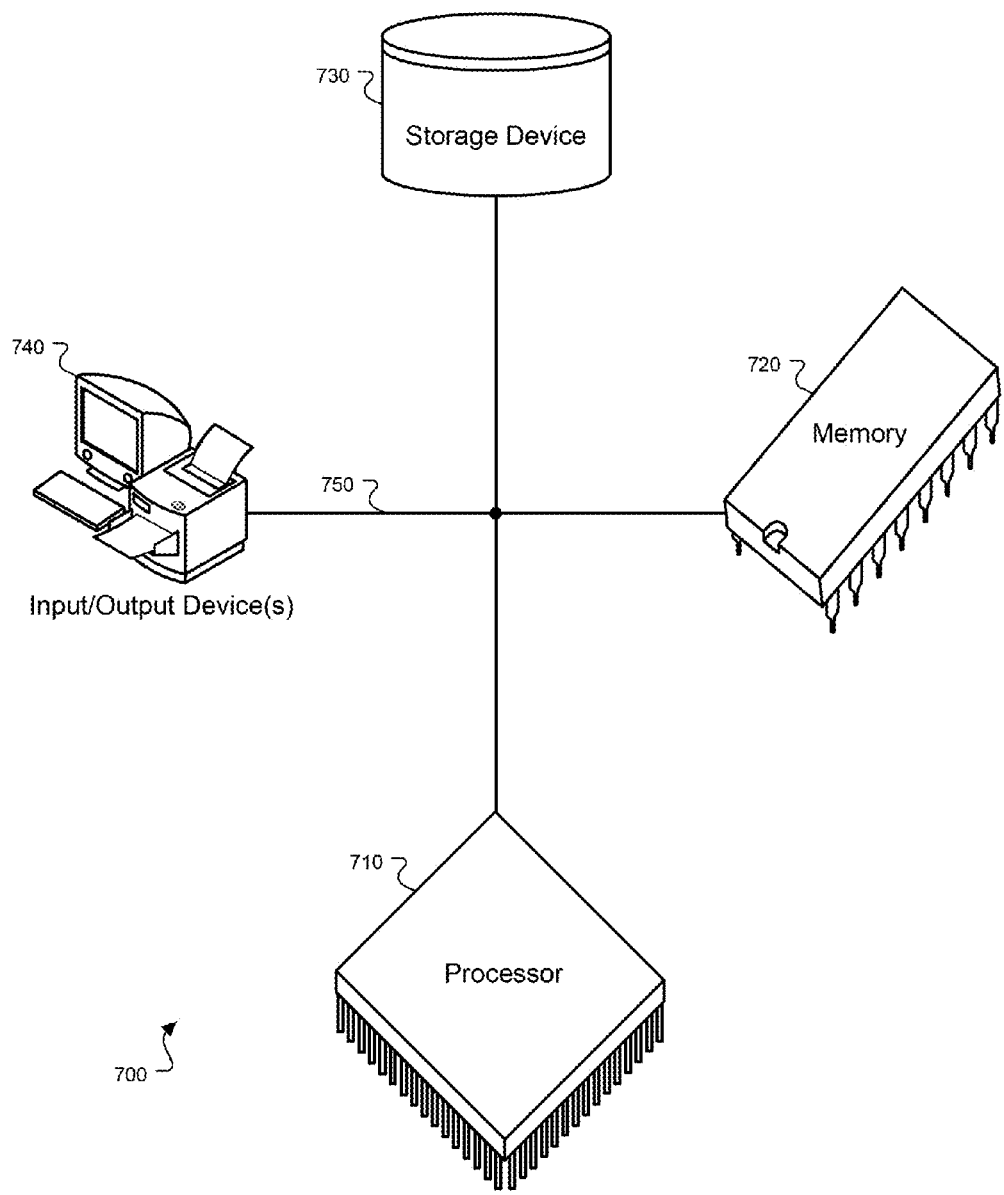
FIG. 7 is a schematic diagram of a generic computer system.

FIG. 7 is a schematic diagram of a generic computer system 700. The system 700 can be used in the operations 400 described above, according to one implementation. For example, the system 700 may be included in either or all of the image processing system 112, the wireless communication device 104, the remote web server 116, and the second remote web server 326.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. Portions of this disclosure discuss the electronic documents including HTML, but any number of formats may be processed by the described system including XML (Extensible Markup Language), WML (Wireless Markup Language), PDF (Portable Document Format), word processing formats, and image formats. Also, the logic flows depicted in the figures do not require the particular order shown, or sequential order, to achieve desirable results. Also, other steps may be provided, or steps may be eliminated, from the described flows, and other components may be added to, or removed from, the described systems. Accordingly, other implementations are within the scope of the following claims.

What is claimed is:

1. A method comprising:
receiving, at a computer system from a mobile computing device, a request for a first electronic document that includes an image;
determining coordinates of a plurality of portions of the image based on optical analysis of the image by the computer system, wherein the optical analysis identifies items in the image that are visually distinct from other items in the image;
using the determined coordinates, identifying a plurality of sub-images of the image in a first arrangement, the plurality of sub-images corresponding to the plurality of portions;
generating a second electronic document that includes the plurality of sub-images in a second arrangement, the second arrangement being different than the first arrangement, wherein the second arrangement groups the plurality of sub-images based on one or more attributes of the sub-images, wherein the one or more attributes based upon which the sub-images are grouped in the second arrangement include image size and image shape; and
providing the second electronic document to the computing device.

2. The method of claim 1, wherein the optical analysis comprises optical character recognition (OCR), and wherein the items identified by the optical analysis comprise text in the image.

3. The method of claim 1, wherein the optical analysis comprises facial recognition, and wherein the items identified by the optical analysis comprise faces in the image.

4. The method of claim 1, wherein the optical analysis comprises optical object recognition, and wherein the items identified by the optical analysis comprise visually distinct objects in the image.

5. The method of claim 4, wherein the optical object recognition identifies objects in the image based on areas of the image that have at least a threshold level of contrast.

6. The method of claim 1, further comprising generating an image map for the image based on the determined coordinates;
wherein the plurality of sub-images are created based on the generated image map.

7. The method of claim 1, further comprising modifying a pre-existing image map that is associated with the image based on the determined coordinates;
wherein the plurality of sub-images are created based on the modified image map.

8. The method of claim 7, wherein modifying the pre-existing image map comprises modifying coordinates contained in the pre-existing image map using the determined coordinates.

9. The method of claim 7, wherein modifying the pre-existing image map comprises supplementing coordinates contained in the pre-existing image map with the determined coordinates.

10. The method of claim 7, further comprising:
obtaining information that indicates a size of a display of the computing device;
based on the obtained information and the pre-existing image map, identifying one or more portions of the image defined by the image map that are too large for the display of the computing device;
for each of the identified portions of the image, selecting coordinates in the identified portion that correspond to one or more of the identified items that are at least partially located in the identified portion and that are determined to have at least a threshold level of relevance to a user of the computing device; and
cropping the identified portions based on the selected coordinates, wherein sub-images corresponding to the identified portions are created based on the cropped identified portions.

11. The method of claim 10, wherein the identified portions are cropped using the selected coordinates so that the one or more identified items determined to have at least the threshold level of relevance are centered in the resulting cropped portions.

12. The method of claim 10, wherein the identified portions are cropped to correspond to the size of the display of the computing device.

13. A system for selecting portions of an image for display on a computing device, the system comprising:
a computer system;
an interface of the computer system that is configured to receive a request from a computing device for a first electronic document that includes an image;
means for determining coordinates of a plurality of portions of the image based on optical analysis of the image by the computer system, wherein the optical analysis identifies items in the image that are visually distinct from other items in the image;
an image extractor of the computer system that is configured to use the determined coordinates to identify a plurality of sub-images of the image in a first arrangement, the plurality of sub-images corresponding to the plurality of portions; and
a document generator of the computer system that is configured to generate a second electronic document that includes the plurality of sub-images in a second arrangement, the second arrangement being different than the first arrangement, wherein the second arrangement groups the plurality of sub-images based on one or more attributes of the sub-images, wherein the one or more attributes based upon which the sub-images are grouped in the second arrangement include image size and image shape;
wherein the interface is further configured to provide the generated second electronic document to the mobile computing device.

14. The system of claim 13, further comprising means for generating an image map for the image based on the determined coordinates;
wherein the plurality of sub-images are created based on the generated image map.

15. The system of claim 13, further comprising means for modifying a pre-existing image map that is associated with the image based on the determined coordinates;
wherein the plurality of sub-images are created based on the modified image map.

16. An apparatus comprising a non-transitory computer readable medium encoding instructions that, in response to execution by a computing device, cause the computing device to perform operations comprising:
receiving, at a computer system from a computing device, a request for a first electronic document that includes an image;

determining coordinates of a plurality of portions of the image based on optical analysis of the image by the computer system, wherein the optical analysis identifies items in the image that are visually distinct from other items in the image;

using the determined coordinates, identifying a plurality of sub-images of the image in a first arrangement, the plurality of sub-images corresponding to the plurality of portions; generating a second electronic document that includes the plurality of sub-images in a second arrangement, the second arrangement being different than the first arrangement, wherein the second arrangement groups the plurality of sub-images based on attributes of the sub-images, wherein the one or more attributes based upon which the sub-images are grouped in the second arrangement include image size and image shape; and providing the second electronic document to the computing device.

17. The computer-program product of claim 16, wherein the operations further comprise modifying a pre-existing image map that is associated with the image based on the determined coordinates;

wherein the plurality of sub-images are created based on the modified image map.

18. The method of claim 1, wherein the one or more attributes based upon which the sub-images are grouped in the second arrangement include content of the sub-images.

19. The method of claim 18, wherein the content comprises items that are depicted in the sub-images.

20. The method of claim 1, wherein the second arrangement includes sub-images with similar attributes being grouped together in the second electronic document.

* * * * *